United States Patent [19]

Wenzel et al.

[11] 4,408,945
[45] Oct. 11, 1983

[54] STATIONARY OR MOBILE RECEIVING BUNKER

[75] Inventors: Jürgen-Michael Wenzel, Düsseldorf; Werner Guderley, Bad Oeynhausen; Ernst Hamel, Löhne, all of Fed. Rep. of Germany

[73] Assignee: PHB Weserhütte Aktiengesellschaft, Fed. Rep. of Germany

[21] Appl. No.: 281,826

[22] Filed: Jul. 9, 1981

[30] Foreign Application Priority Data

Dec. 27, 1980 [DE] Fed. Rep. of Germany ....... 3049236

[51] Int. Cl.³ ..................... B65D 88/54; B65G 47/90; A01F 25/18
[52] U.S. Cl. .................................. 414/325; 414/303; 414/332
[58] Field of Search ............... 414/304, 327, 332, 376, 414/572–575, 919, 303

[56] References Cited

U.S. PATENT DOCUMENTS 1,739,887 12/1929 Carman .......................... 414/327 X
4,310,278 1/1982 Wenzel et al. ...................... 414/332

Primary Examiner—Robert G. Sheridan
Attorney, Agent, or Firm—James E. Bryan

[57] ABSTRACT

This invention is an improvement in a stationary or mobile receiving bunker adapted to be fed with bulk material, particular by means of industrial trucks, with a delivery conveyor arranged under the receiving bunker, the improvement which comprises two bunker walls enclosing the receiving bunker chamber on the side away from the direction of delivery, with straight lines running through their top edges and projected onto a horizontal plane each forming an angle $\alpha < 90°$ with the longitudinal axis of the delivery conveyor also projected onto the horizontal plane.

5 Claims, 2 Drawing Figures

STATIONARY OR MOBILE RECEIVING BUNKER

This invention relates to a stationary or mobile receiving bunker which can be fed with bulk material, in particular by means of industrial trucks, with a delivery conveyor arranged under the receiving bunker which draws the bulk material out of the receiving bunker.

Receiving bunkers of the kind mentioned are preferably employed in quarries and open-cast ore and coal mines, and serve to receive bulk material transported by industrial trucks, such as dumpers or front-end loaders, and feed it continuously be means of the delivery conveyor to a subsequent installation. In the case of coarse bulk material in particular, this is a crushing plant which crushes the bulk material so that it can be conveyed onwards by means of a belt conveyor installation. The capacity of the receiving bunker is dependent not only on the throughput capacity of the subsequent installation and the loading capacity of an industrial truck, but also on whether it can be fed from more than one side simultaneously.

A receiving bunker with delivery conveyor which can be fed simultaneously from three sides by dumpers is known from DE AS No. 1,607,486. In this known arrangement, the bunker chamber which is open in the direction in which the delivery conveyor moves is enclosed by two side walls and a back wall, the top edges of the side walls projected in a horizontal plane being parallel and the top edge of the back wall perpendicular to the longitudinal axis of the delivery conveyor. In order to enable the receiving bunker to be fed from three sides, provision is made to place the arrangement on an inclined floor of a pit so that the top terminating edges of the side walls and back wall are roughly on a level with the surface on which the dumpers travel.

With this solution, however, there is the danger, especially in wet regions, that the pit will run full of water or silt up.

Another known method is to arrange the receiving bunker and the subsequent installations on a floor which rests below the floor on which the dumpers travel by about the height as far as the top edge of the receiving bunker, and where the back wall of the feed bunker stands in front of the slope which has been made safe by a supporting wall. The disadvantage of being able to feed the receiving bunker only from one side with this solution can be remedied by standing it in a tailor-made trench, so enabling it to be fed from the side again. However, a disadvantage is that the slope has to be made safe over a fairly long area, because to feed the bunker from the side the dumpers have to come very close to the edge of the slope. Another disadvantage is that, when changing the site, the receiving bunker first must advance by the depth of the trench before it can be moved sideways.

This leads to difficulties particularly in cases where the receiving bunker with delivery conveyor is coupled to a mobile crushing plant to form one travelling unit (DE OS No. 1,960,686) or is an integral part of the travelling crusher itself and the travelling crusher has a conveyor belt following it for conveying the crushed material onwards, the conveyor belt permitting only slight forward travel, so that when changing the location it is necessary to remove a part of the belt installation.

The object of the present invention is to provide a mobile receiving bunker which can be fed in particular by industrial trucks with a delivery conveyor arranged under the receiving bunker such that it can be fed from more than one side and maneuvred in the most confined space.

The solution according to the invention provides the advantage, in particular for mobile installations which can be fed from more than one side and which rest below the travelling floor of the industrial trucks, for example dumpers, by about the height up to the top edge of the receiving bunker, that the trench which is necessary when feeding the receiving bunker from more than one side and which is tailor-made for the bunker is no longer so deep, and that the dumpers no longer have to drive in the immediate proximity of the edge of the slope.

The solution according to the invention is distinguished in particular by good maneuvrability. When changing the location, the travelling motion in the delivery direction can have travelling motion perpendicular thereto superimposed thereon, so that the direction of travel resulting from both travelling motions forms an angle with the longitudinal axis of the delivery conveyor, this angle being a fraction smaller than that formed between the slope edge of the trench and the longitudinal axis. After just a short movement in the aforementioned resulting direction of travel, the installation can be swung into a direction of travel parallel to the slope edge or to a belt installation following the installation and lying parallel to the slope edge, without there being a collision with the belt installation.

With the receiving bunker designed symmetrically to the longitudinal axis of the delivery conveyor, the bunker can be moved out of the trench from two sides in the same manner. With the top edges of the bunker walls vertical to one another and converging above the longitudinal axis of the delivery conveyor, the slope of the walls is also guaranteed to be great enough for the bulk material to slide down on them unhindered to the delivery conveyor.

The invention is further described in the following with the aid of the practical example illustrated in the accompanying drawings, in which.

Figure 1:
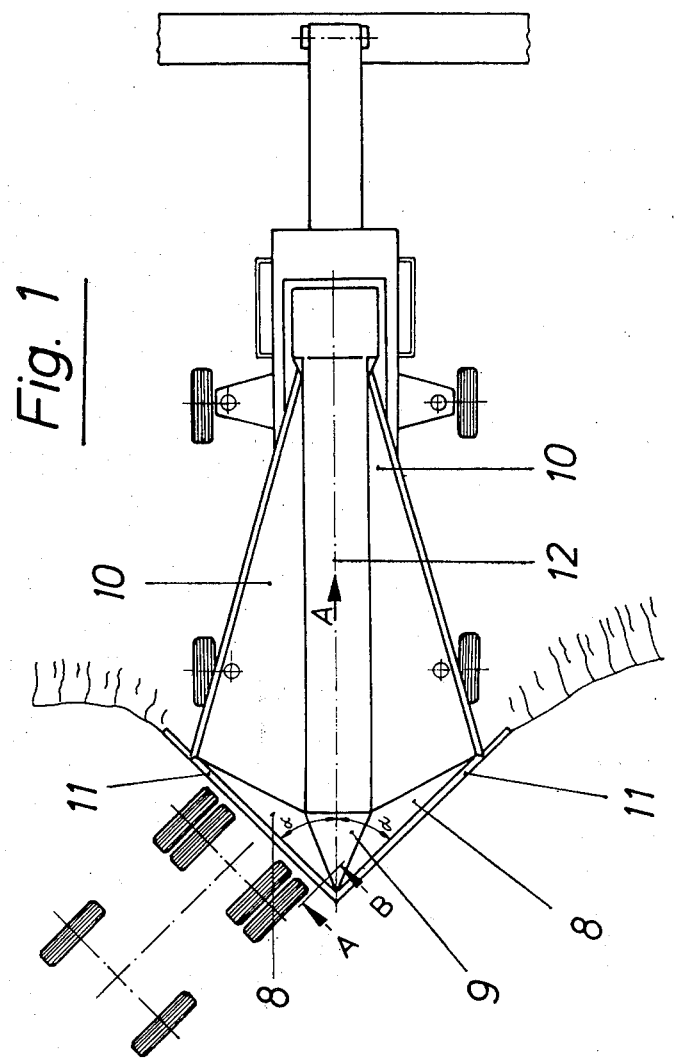
FIG. 1 shows a top view of a mobile crushing plant.
Figure 2:
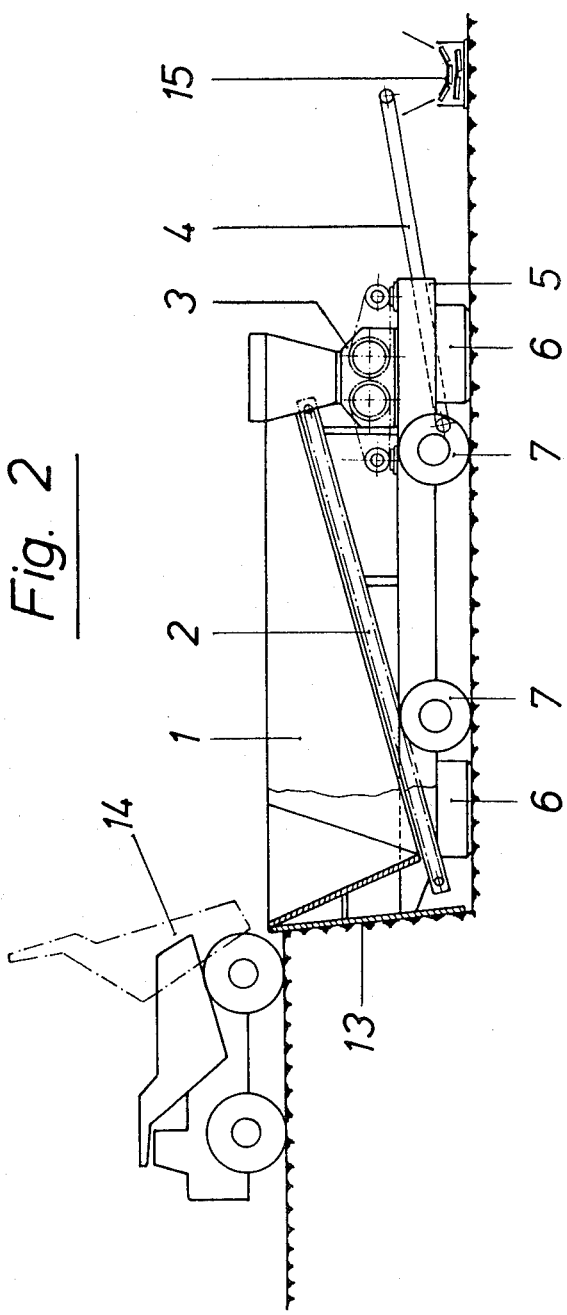
FIG. 2 shows a side view with a part section A-B.

The mobile crushing plant illustrated in the figures comprises the receiving bunker 1, the delivery conveyor 2 lying thereunder, the crusher 3, and the discharge conveyor 4. The aforementioned elements, together with all the necessary driving facilities, are mounted on a supporting structure 5 which when in working position rests on the support pontoons 6 on the ground. The supporting structure can be raised, lowered and moved by means of the wheel sets 7 equipped with lifting and steering facilities, not shown.

As can be seen in FIG. 1, the bunker chamber is enclosed on the side away from the delivery direction A of the delivery conveyor 2 by two bunker walls 8 and the triangular bunker wall 9, and laterally by the bunker walls 10. The top edges 11 of the bunker walls 8 each form an angle $\alpha < 90°$ with the longitudinal axis 12 of the delivery conveyor 2 and have a common point of contact above the longitudinal axis 12.

In the practical example, the bunker walls 8 are symmetrical to the vertical plane defined by the longitudinal axis 12 of the delivery conveyor 2 and their top edges 11 form an angle $\alpha = 45°$ each with the longitudinal axis 12. This symmetrical design is preferable to a possible asymmetric design for design and manufacturing reasons.

For feeding the receiving bunker 1 by means of dumpers 14, the mobile crushing plant stands on a floor which rests below the travelling floor of the dumpers by about the height of the top edge of the bunker and projects with the end of the receiving bunker 1 facing away from the delivery direction A into a trench made to fit the side walls 8 of the bunker. According to FIG. 1, the bunker can be fed from two sides, the travelling routes of the dumpers 14 being at right angles to the bunker edges 11, which are at the same time tipping edges, so that the dumpers 14 do not obstruct each other when travelling and dumping.

The travelling routes of the dumpers 14 are a sufficiently safe distance from the slope edge.

With the angle chosen $\alpha = 45°$, the bunker walls are sufficiently inclined to ensure that the bulk material, in particular bulk material with a tendency to stick, which is dumped by the dumpers 14 into the feed bunker 1 does not cling to the walls.

The delivery conveyor 2, for example a steel plate conveyor, draws the bulk material out of the bunker 1 and feeds it continuously to the crusher 3. The crushed bulk material is transferred by the discharge conveyor 4, situated under the crusher delivery to a subsequent belt installation 15.

When changing the operating site, the crushing plant is first driven forward in one direction, forming an angle $<\alpha$ with the longitudinal axis 12 of the delivery conveyor 2, and after moving only a short distance can be swung into a direction parallel with the slope edge without a part of the belt conveyor 15 having to be removed.

It is advantageous to provide supporting walls 13 behind bunker walls 8 and 9, these supporting walls being connected to the bunker walls or supporting structure 5 and reaching from the top edge of the bunker to roughly the ground. These replace the slope retaining walls, for example concrete walls, which are otherwise required.

In the case of mobile crushing plants which are raised for moving, it is practical for the bottom edges of the supporting walls 13 to be in front of the top edges, viewed in the delivery direction A, so that they lift away from the slope as soon as the plant is raised.

The form of bunker according to the invention also can be used to advantage with stationary installations. For this purpose, it is possible to construct the bunker wall 9 in trapezoidal form, the length of the top edge being greater than the bottom edge and perhaps greater than the length of the top edge 11 of bunker walls 8, so that this bunker can also be fed from three sides.

It will be obvious to those skilled in the art that many modifications may be made within the scope of the present invention without departing from the spirit thereof, and the invention includes all such modifications.

What we claim is:

1. In a stationary or mobile receiving bunker adapted to be fed with bulk material, in particular by means of industrial trucks, with a delivery conveyor arranged under the receiving bunker, the improvement which comprises two bunker walls enclosing the receiving bunker chamber on the side away from the direction of delivery, with straight lines running through their top edges and projected onto a horizontal plane each forming an angle $\alpha < 90°$ with the longitudinal axis of the delivery conveyor also projected onto the horizontal plane, said top edges of the two bunker walls enclosing the bunker chamber on the side away from the delivery direction having a common point of contact above the longitudinal axis of the delivery conveyor.

2. A stationary or mobile receiving bunker in accordance with claim 1, in which the straight lines through the top edges of the bunker walls and projected onto a horizontal plane each form an angle $\alpha = 45°$ with the longitudinal axis of the delivery conveyor projected onto the horizontal plane.

3. A stationary or mobile receiving bunker in accordance with claim 1 or claim 2, in which the two bunker walls enclosing the bunker chamber on the side facing away from the delivery direction are arranged symmetrically to the vertical plane defined by the longitudinal axis of the delivery conveyor.

4. A stationary or mobile receiving bunker in accordance with claim 1 or claim 2, including supporting walls arranged behind the bunker walls enclosing the bunker chamber on the side away from the delivery direction, said supporting walls being connected to the bunker walls or the supporting structure and reaching from the top edge of the bunker walls about to the ground.

5. A stationary or mobile receiving bunker in accordance with claim 4, in which the supporting walls are inclined to the vertical such that their bottom edges when viewed in the delivery direction are forward of the top edges.

* * * * *